Aug. 13, 1940.
C. B. NELSON ET AL
2,211,744
METHOD OF FORMING A BINDER
Original Filed July 17, 1936    3 Sheets-Sheet 1
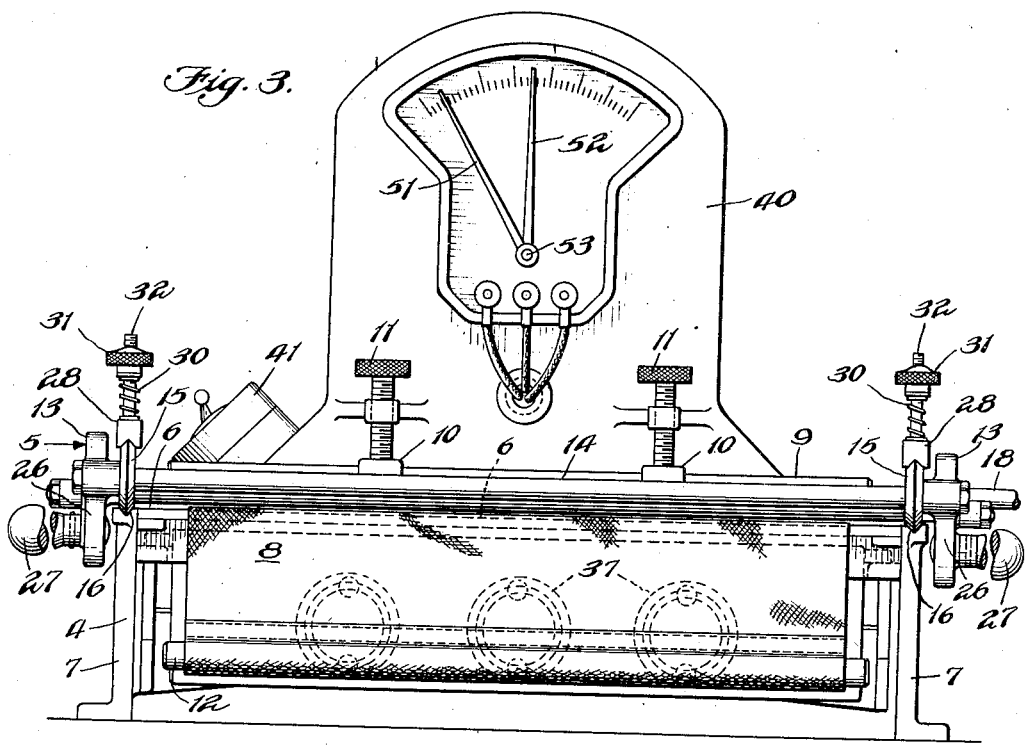
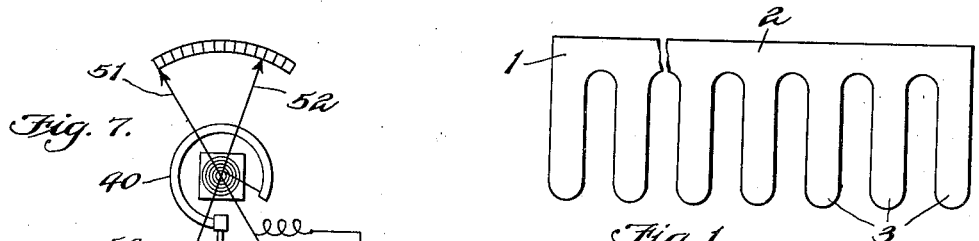
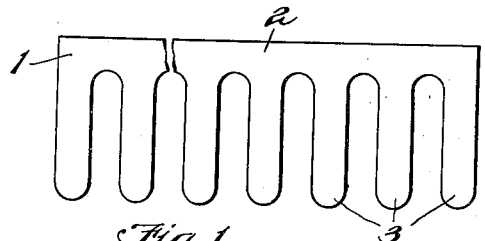
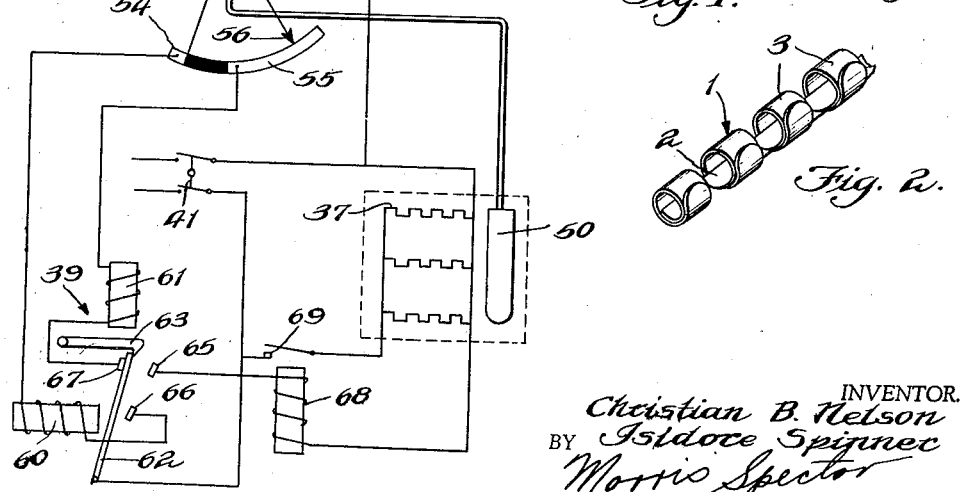
INVENTOR.
Christian B. Nelson
BY Isidore Spinner
Morris Spector
ATTORNEY.

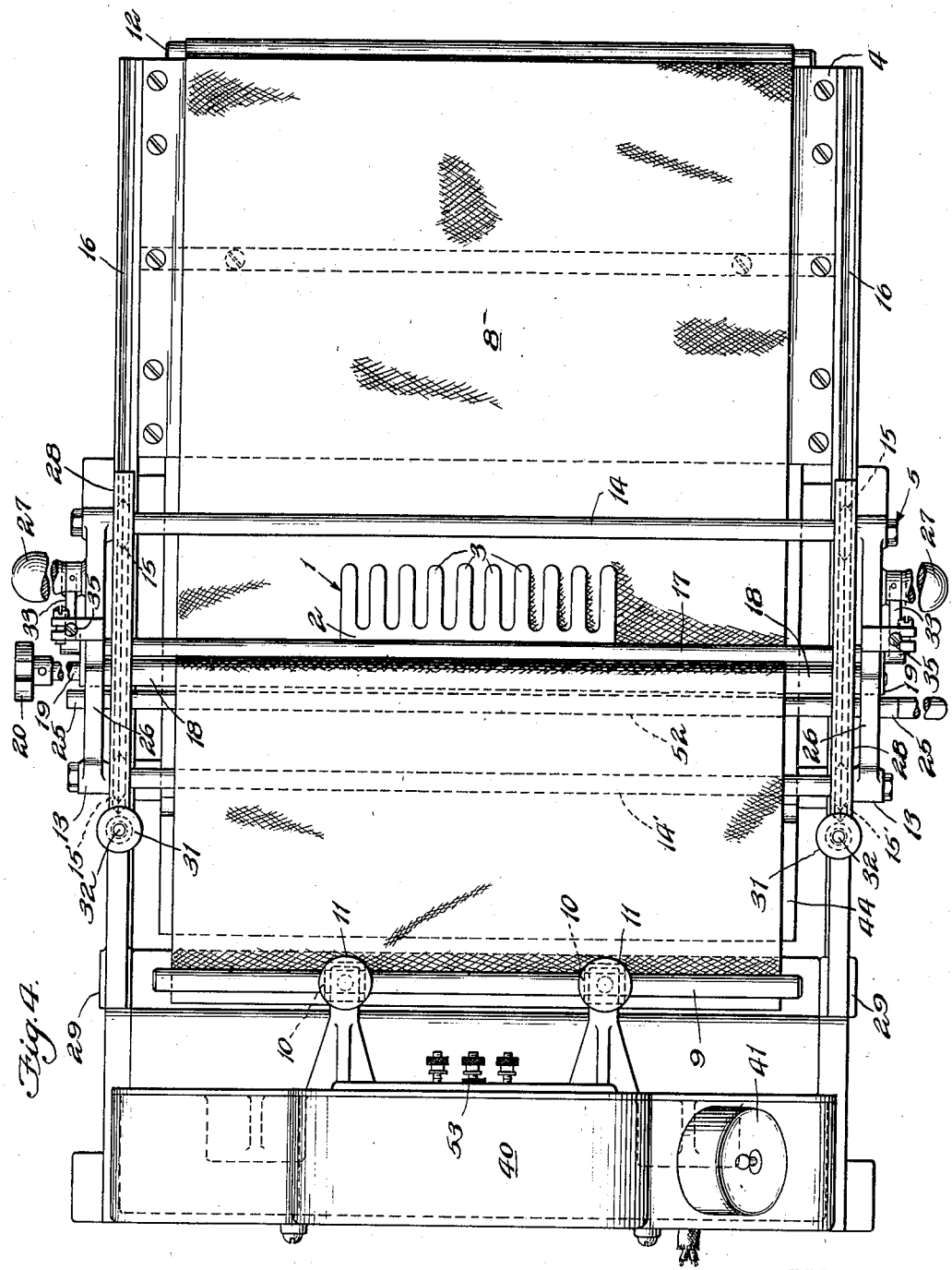

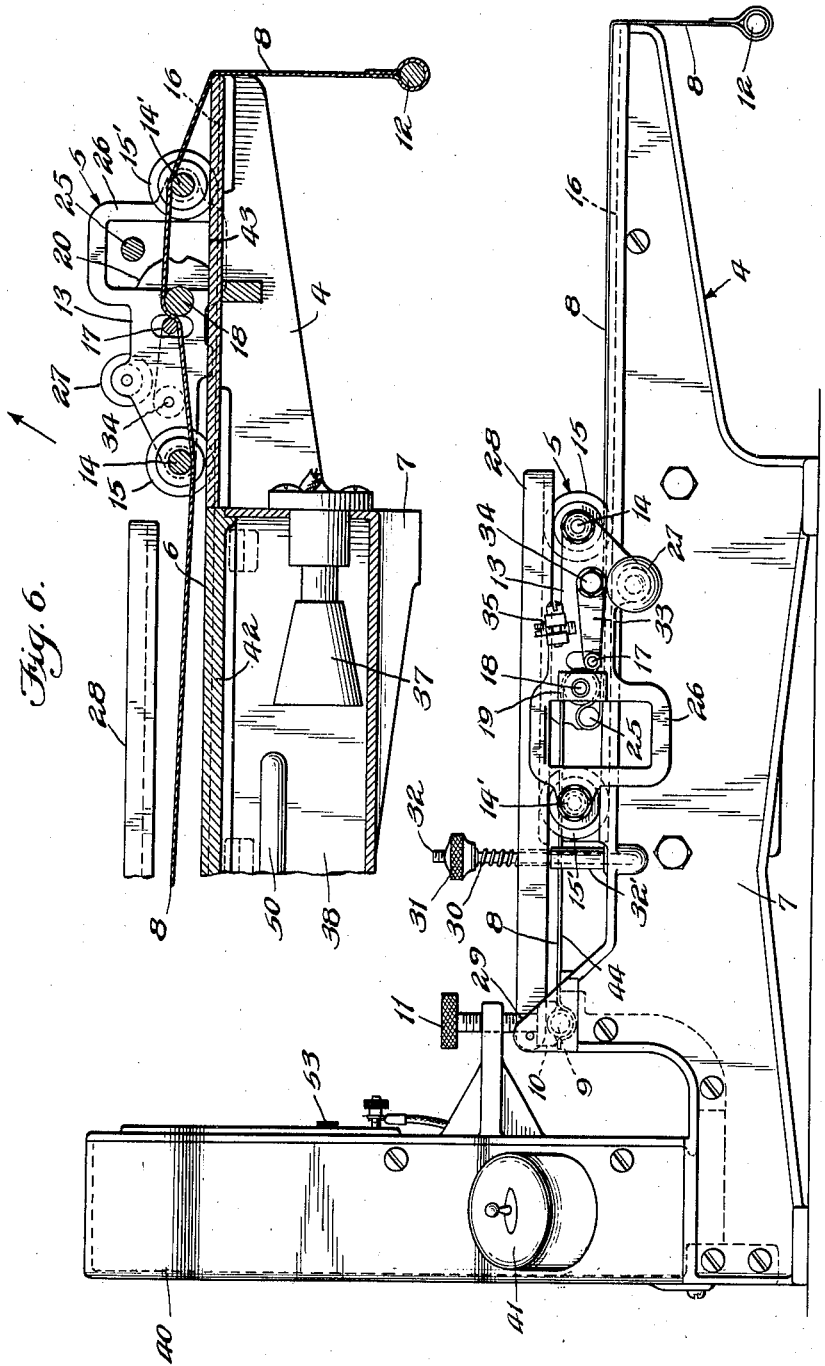

Patented Aug. 13, 1940

2,211,744

UNITED STATES PATENT OFFICE 2,211,744

METHOD OF FORMING A BINDER

Christian B. Nelson and Isidore Spinner, Chicago, Ill., assignors, by mesne assignments, to Plastic Binding Corporation, Chicago, Ill., a corporation of Delaware Original application July 17, 1936, Serial No. 91,093. Divided and this application February 27, 1937, Serial No. 128,107

11 Claims. (Cl. 18—56)

This application is a division of our co-pending application, Serial No. 91,093, filed July 17, 1936.

The present invention relates to a method of forming a binder, and more particularly such a binder as may be used for binding sheets of paper, note books, books, or the like. In its more particular aspects the binder of the present invention is formed of a comb-shaped strip of Celluloid, pyroxylin, or the like. The binder is one of the general type disclosed in the patent to Douvry, No. 1,970,285, issued August 14, 1934. A suitable machine for inserting pages, cards, or the like, into this binder is disclosed in our pending application Serial No. 70,355, filed March 23, 1936. The material used for forming a binder by the method of the present application is of the type which becomes plastic when heated and may be formed to the desired shape, which shape is retained when the material is cooled. The blank consists of a continuous back portion from which a plurality of parallel fingers extend.

One of the principal objects of the present invention has to do with the provision of the novel method of curling these fingers upon themselves to form a plastic tubular binder of predetermined diameter. One of the problems in connection with the formation of such a binder is that of the proper heat application, both as to temperature and as to duration. We have found that if the stock is overheated it becomes soft, loses it form, and tends to adhere to the arbor about which it is curled. The resulting product is commercially undesirable. On the other hand, if the material is underheated it fails to curl properly, resulting also in an undesirable binder. The attainment of the proper temperature, and proper duration for heating are important. In order to avoid overheating of the article it appeared, at first, to be necessary to apply a gradual heat to raise the temperature thereof slowly. This is objectionable in that it greatly increases the cost of making the article. We have discovered that the proper heating of the stock can be obtained, quickly, and reliably, by heating the same in two stages. In the first stage the stock is heated to a temperature slightly below that required for efficient manufacturing operations. The preheated stock is then placed in its operating position where the temperature thereof is raised a small amount, to bring it to the proper point for efficient curling. Due to the fact that the material has been preheated, the additional necessary rise in temperature can be effected quickly, and with precision.

The attainment of the above and further objects of the present invention will be apparent from the following specification taken in conjunction with the accompanying drawings forming a part thereof.

In the drawings:

Figure 1 illustrates a binder blank as cut out, but before it is curled;

Figure 2 is a perspective view of a curled binder made by the machine of the present invention;

Figure 3 is a front elevation of a machine embodying the principles of the present invention;

Figure 4 is a plan view of the machine shown in Figure 3;

Figure 5 is a side elevation of the machine shown in Figures 3 and 4;

Figure 6 is a partial sectional elevation showing the carriage in one position; and Figure 7 is a circuit diagram illustrating the heating control.

Like reference numerals refer to like parts throughout this specification and the appended drawings.

Referring to Figure 1, the blank 1 is formed of Celluloid, pyroxylin, or any other resilient material which, when heated, becomes plastic and can be formed to the desired shape. Before being curled the blank is in the shape of a comb, having a continuous back portion 2 and a plurality of parallel fingers 3 extending therefrom.

After the comb 1 has been curled, as will be explained later, the binder takes a cylindrical form, as shown in Figure 2, each finger being curled convolutely upon itself. The binder is made of a material which, although plastic when heated, has sufficient elasticity at room temperatures, so that the fingers may be uncurled to the flat position and upon being released resume the curled form illustrated in Figure 2. A pack of paper, cards, or the like, with aligned perforations, may therefore be positioned so that when the fingers 3 curl under their natural resiliency they pass through the perforations and thus bind the sheets together. Apparatus for performing this assembly operation is disclosed in our co-pending application Serial No. 70,355, filed March 23, 1936.

Referring now to Figures 3, 4 and 5, the curling machine comprises essentially, a stationary table 4 and a carriage 5 movable thereon. The table 4 comprises a working plate 6, which is preferably of metallic or other heat conducting material, mounted on a supporting structure 7.

A wrapper 8, consisting of a sheet of flexible material such as paper, cloth or the like, which has the property of not adhering to the plastic binder, is spread on the plate 6, being fixed at the rear of the table by a rod 9 which clamps the wrapper to the table by means of clamps 10, actuated by hand screws 11, the rod 9 thus bearing across the end of the sheet 8. The front end of the sheet hangs over the front of the table 4 and is kept under a slight tension by means of a weight 12 for the purpose of maintaining the sheet smoothly stretched across the table.

The carriage 5 comprises a pair of end frames 13 secured together by transverse rods 14, 14' which serve as axles for wheels or rollers 15, 15', which support the carriage 5. The wheels have V-shaped treads which roll in V-shaped tracks 16, the carriage thus being positively aligned on the table. The end frames 13 are disposed outside of the supporting frames 7 of the table 4, with suitable clearance therebetween so that the carriage can be rolled on the table, either in the normal position as shown in Figures 3, 4 and 5, or upside down as indicated in Figure 6.

Referring now to Figure 6 which illustrates the initial position of the carriage, the wrapper 8 passes under the rear axle 14, under an aligning rod 17, over a guiding roller 18, over the front axle 14' and down over the front edge of the table. The guiding roller 18 extends across the table between the end frames 13 in which it is rotatably supported in end bearings 19, with its axis of rotation perpendicular to the direction of movement of the carriage. The roller 18 may be turned by hand by means of a hand wheel 20 fixed to one end thereof.

To prepare the apparatus for a curling operation, the first step comprises inserting an arbor 25 under brackets 26 in the end frames 13, in a position above the wrapper 8, as illustrated in Figure 6. The arbor consists of a cylindrical copper or steel rod of a length great enough so that it extends beyond the frames 13 at either side, as indicated in Figure 4.

The diameter of the arbor is made equal to the predetermined desired inside diameter of the curled binders. Hence, where it is desired to make binders of several different diameters, it is necessary to provide a different arbor for each of the desired inside diameters. In all other respects, this apparatus can be used for curling binders of a wide range of lengths, diameters and thicknesses, as will be explained later.

After insertion of the arbor through the brackets 26, while the carriage is in the position indicated in Figure 6, the carriage is turned over in a clockwise direction about the roller 15' as a center, as indicated by the arrow in Figure 6. Handles 27 are provided on the end frames 13 to facilitate turning the carriage. During this reversal, the bracket 26 carries the arbor 25 to a position on the table back of the roller 18, as illustrated in Figure 5.

The wrapper 8, in this position of the carriage, now passes over the top of the roller 18 and winds around and under the roller, and then back over and around the arbor in a reverse curve, so that the front portion of the wrapper lies spread on the surface of the table or working plate 6, and is stretched tight and smooth by the weight 12. Hence the arbor 25 is caught in the turn of the wrapper and held up against the roller 18.

The next operation consists in moving the carriage toward the left, to the back of the table, whereupon the wheels 15, 15' move under a pair of pressure bars 28—28, each of which is grooved on its under side to fit over the V-shaped wheels 15. These bars 28 are hinged to brackets 29 at the rear of the table, and pressure is maintained by compression springs 30 which press the bars down on the wheels 15, the amount of pressure being adjustable by means of thumb screws 31, which cooperate with threaded studs 32 at the ends of pressure bar guide posts 32' which limit the extent of downward movement of the pressure bars 28 when the carriage is at the forward end of the machine. The posts are anchored in the frame 7 and the studs extend through the springs and through holes in the bars 28. Hence, the carriage, when on the rear portion of the table, is held in alignment by the V-shaped wheels in the grooved tracks 16, sufficient pressure being exerted downward against the wheels to keep them firmly seated in the grooves. In this position the roller 18 is maintained parallel to the surface of the plate 6, with sufficient clearance to pass a flat binder blank under the roller 18, as will be explained presently.

The aligning rod 17 extends through an arcuate slot in each frame 13 and is carried on a pair of crank arms 33 pivoted to the end frames 13 respectively. Upward turning of the crank arms 33 around their pivots 34 is limited by adjustable screw stops 35. The rod 17 is disposed parallel to the roller 18 and hence to the arbor 25.

As the preferred material of which the binders are made requires the application of heat to cause it to become plastic, heating units 37 are provided in a chamber 38 beneath the back portion of the working plate 6. By means of these heaters, this portion 42 of the plate is kept hot at the desired temperature, which may be in the order of 300° to 365° F. depending on the thickness of the material being curled. In this embodiment the heaters are indicated as of the electric type, which by means of a thermostatically controlled relay 39, can be controlled to maintain a substantially even temperature within the chamber 38. A temperature indicator 40 is provided at the rear of the table, as well as a switch 41 for energizing the heat control equipment.

Referring now more particularly to Figure 4, a blank 1 of the material to be curled, is now laid on the wrapper 8 on the table in front of the roller 18, with the continuous back portion 2 pressed against the aligning rod 17 and aligned therewith, thereby aligning the blank 1 parallel to the arbor 25, with the fingers 3 at right angles thereto. Then by moving the carriage forward, the aligning rod 17 rides up over the blank 1, the stops 35 being adjusted to permit the crank arms 33 to rise only an amount sufficient to allow the aligning bar 17 to rise over the blank, and exert a small amount of pressure thereagainst. As the carriage moves forward, the roller 18 passes over the blank 1 without touching it, and finally the blank is wrapped around the arbor 25. With proper tension applied to the wrapper 8, the wrapper holds the piece in contact with the arbor 25, the roller 18 keeping the wrapper wrapped around a substantial portion of the surface of the arbor.

As the blank engages the arbor, it is desirable to turn the roller 18 by the hand wheel 20 as the carriage progresses, to prevent the wrapper from catching or sticking. By turning the wheel 20, the winding action of the wrapper 8 can be insured, notwithstanding the resistance offered by the blank 1. The carriage is then rolled further to the right from the position shown in Figure 5 so that the blank is wrapped around the arbor 25 and held in place by the wrapper 8 which, in turn, is held in wrapped position by the roller 18 and the weight 12. At this point in the process the arbor 25 and the piece 36 are being rolled across the hot portion 42 of the working plate 6, during which time the blank 1 has become further heated to bring it to its plastic condition.

Further movement of the carriage 5 rolls the arbor from the hot portion 42 of the plate 6 to a comparatively cooler portion 43 at the front of the table. As the binder cools on the arbor it loses its plasticity and become elastic, but retains its curled shape. Therefore, it may now be removed from the arbor 25. This is accomplished by again reversing the carriage after it has passed out from under the pressure bars 28. By turning the carriage over, this time in a counter-clockwise direction, it is again placed in the position shown in Figure 6. Now the arbor can be withdrawn from the brackets 26, and the curled binder can be slipped off the arbor, and is now curled as shown in Figure 2. After the binder is cool, it is elastic, so that if the fingers are straightened they will recurl upon being released, as heretofore explained.

The carriage is now again in position for the initial operation of inserting the arbor. It is desirable to cool the arbor between operations so that each successive binder will receive equal amounts of heat and be subjected to the same temperature. In practice, this is done by keeping a supply of arbors at hand, a cool arbor being taken for each operation.

It is desirable that the blanks 1 be heated to their proper temperature quickly, without any danger of overheating. To accomplish this result we provide for the preliminary heating of the blanks to a temperature approximately, but slightly under, the requisite curling temperature. A preheated blank may then be placed on the table 6 where it is quickly brought to its proper temperature, even though the table 6 is not appreciably above the requisite temperature. If a cold blank were placed on the table 6 it would have to remain on the table an appreciable length of time before its operating temperature was reached, which would slow down the manufacturing processes, or the table would have to be at an appreciably higher temperature, with the consequent danger of overheating the blank if it is kept on the table too long. To effect the preliminary heating of the material, a preheating plate 44 is provided at the rear of the table, said preheating plate being but a continuation of the plate 6, and somewhat above the working surface of the plate 6. The preheating plate 44 is disposed over an auxiliary warming chamber 45 which is in communication with, and constitutes an extension of, the heating chamber 38. A stack of blanks, or flat pieces 1 to be curled, is kept on this preheating plate 44, from which stack the pieces are withdrawn for curling.

It is essential that the temperature be accurately controlled. If the temperature is too high, the material may adhere to the arbor, or the comb teeth may loose their shape, or other objectionable results may follow. If the material is too cold it will not curl properly. It is, therefore, essential that the temperature be correct, and the duration of the application of heat be correct. The optimum operating temperatures differ for combs of different thicknesses. We provide means for regulating the temperature of the machine to maintain the same within proper limits, the arrangement being such that the operating temperature of the machine may be changed, at will, as may be required for combs of different thicknesses. In Figure 7 we illustrate one control system. A temperature responsive element 50 is located within the heating chamber 38. This element comprises a metal tube containing a suitable liquid which expands in proportion to the temperature. The expansion of the liquid controls a movable pointer 51 of the indicator 46, whereby this pointer indicates the temperature within the heating chamber. Another pointer 52, which is the control pointer, may be set at any point on the scale of the indicator 46, by means of a knob 53 (Fig. 3). The pointer 52 carries a contact support having two contacts 54—55 which are engaged by a contact 56 on the pointer 51 in different positions of the pointer 51. The contacts 54—55—56 control the windings of the relay 39. The relay 39 includes two windings, namely, an "off" winding 60 and an "on" winding 61. The winding 60 controls a switch spring 62, and the winding 61 controls a latch 63. When the contact 56 of the pointer 51 engages the contact 55 it establishes a circuit for the winding 61, which attracts the latch 63, thereby releasing the contact spring 62. The contact spring 62 then moves into engagement with a contact 65 and a contact 66. It also moves out of engagement with a contact 67. When it moves out of engagement with the contact 67 it opens the circuit for the winding 61. When it engages the contact 66 it prepares a circuit for the winding 60, which circuit is at that time open at the contacts 54—56, which are not in engagement with one another. At its contact 65 the contact spring 62 establishes a circuit for the operating winding of an electromagnetic switch 68, which thereby operates and, at its contacts 69, establishes a circuit for the heating elements 37. The heating elements thereby commence to heat the chamber 38. Heating of the chamber 38 causes the pointer 51 to move in a clockwise direction. When the temperature has risen sufficiently, the contact 56 engages the contact 54. This establishes a circuit for the winding 60, by way of the contact 66 and the contact spring 62, through the operating winding 60, contact 54, contact 56, to the opposite side of the line. Energization of the winding 60 causes the spring 62 to be drawn back to the position indicated in Figure 7 where it becomes latched by the latch 63. Opening of the contact 66 opens the circuit for the winding 60. Opening of the contact 65 causes deenergization of the relay 68, resulting in opening of the contacts 69, which opens the circuit for the heaters 37. At the now closed contact 67 a circuit is prepared for the operating winding 61. The temperature of the heating chamber 38 now commences to drop. When the temperature has fallen sufficiently to cause the contact 56 to engage the contact 55 the relay 61 is again energized, thereby again effecting release of the contact spring 62 and operation of the relay 63 to reclose the heater circuit. Thus the temperature within the heating chamber 38 is maintained within narrow limits determined by the distance between the contacts 54—55, and at a value determined by the position of the contacts 54—55 as set by the knob 53.

In compliance with the requirements of the patent statutes we have here shown and described a preferred embodiment of our invention. It is, however, to be understood that the invention is not limited to the precise construction here shown, the same being merely illustrative of the principles of the invention. What we consider new and desire to secure by Letters Patent is:

1. The method of curling a piece of thermoplastic material of the class described, which comprises laying said piece on a flexible sheet, rolling an arbor along said sheet and over said piece while keeping one end of the sheet substantially stationary, winding said sheet around at least a portion of the surface of said arbor to conform said piece to said arbor, and while said piece is wrapped on said arbor maintaining said piece at an elevated temperature sufficient to soften the material enough to impart a permanent set to said piece when cooled but insufficient to fuse the material, and cooling said material to set the same.

2. The method of curling a piece of thermoplastic material, which comprises placing said piece on a flexible sheet, preheating the piece to a temperature sufficient to soften the material but below the temperature at which fusion occurs, wrapping said sheet and said piece around an arbor, and during the wrapping operation further increasing the temperature of the piece but also below the temperature at which fusion occurs, and then cooling the piece to permanently set the same.

3. The method of curling a piece of thermoplastic material, which comprises rolling said piece around an arbor and wrapping a flexible sheet around said piece to hold it in curled position on said arbor, and rolling said arbor over a heated surface sufficiently hot to soften the material without fusing it, and then allowing the curled piece to cool on the arbor to a temperature at which the plastic piece sets.

4. The method of curling a piece of thermoplastic material, which comprises rolling said piece around an arbor and winding a flexible sheet around said arbor over said piece to hold said piece in conformity with said arbor, and rolling said arbor first over a surface sufficiently hot to impart a permanent set to the material upon subsequent cooling and then over a comparatively cooler surface and permitting the rolled piece to cool on the arbor to a temperature sufficiently low for the material to set.

5. The method of curling a piece of thermoplastic material which comprises heating the material to a temperature approaching but not exceeding the temperature required for imparting a permanent set to the material when curled, wrapping the material around an arbor, and after commencement of the wrapping operation but before removal from the arbor momentarily applying a temperature to the material in excess of that required for imparting a permanent set to the material around the arbor upon subsequent cooling, the duration of the application of the higher temperature being insufficient to cause fusion of the material, and then permitting the curled plastic material to cool on the arbor.

6. The method of curling a piece of thermoplastic material, which comprises flexing said piece and a flexible sheet into a roll with the sheet on the outside of the roll, then rolling said roll over a heated surface, maintained at such a temperature as will soften the material sufficiently to impart a permanent set to the material upon subsequent cooling, then permitting the material to cool on the roll to a temperature at which it retains its set form.

7. The method of rolling a piece of thermoplastic material which comprises heating the piece to a temperature approaching but under the softening temperature, then placing said preheated piece on a heated surface and raising the temperature of said piece to a temperature at which it is soft, then rolling said piece into a roll while maintaining it at said raised temperature, holding the piece in its rolled form while permitting the same to cool to a temperature at which it retains its set form, and then releasing the hold on said piece.

8. The method of rolling a piece of thermoplastic material which comprises, placing said piece on a flexible sheet, heating it to a temperature at which it is soft but below the fusion temperature, then rolling the plastic piece and the sheet into a roll while pressing the sheet against the plastic piece.

9. The method of forming a binder from a piece of thermo-plastic material having a back portion and a plurality of spaced parallel fingers extending from the back at substantially right angles thereto, which comprises placing said piece on a flexible sheet, bringing the back of said piece and an arbor into engagement, the piece being positioned on the sheet with the back thereof parallel to the axis of the arbor and with the back engaging the arbor before the fingers engage the arbor, curling said piece of plastic material around said arbor by a rolling action progressing from the back towards the tips of the fingers remote from the back, during the curling action winding the flexible sheet around said curled plastic piece through an angle which is a substantial fractional part of 360°, maintaining one end of the sheet fixed and exerting a continuous tension on the other end to press the plastic piece towards the arbor, rolling the arbor with the curled piece around it along a flat surface while maintaining the flexible sheet wound around said piece, and during the rolling action maintaining the plastic piece at a temperature below that at which fusion occurs but sufficiently elevated to soften the material enough to impart a permanent set to the curled plastic material upon subsequent cooling, and then permitting the curled plastic material to cool.

10. The method of forming a binder from a piece of thermo-plastic material having a back portion and a plurality of spaced parallel fingers extending from the back at substantially right angles thereto, which comprises bringing the back of said piece and an arbor into engagement with one another with the axis of the arbor extending lengthwise of the back, curling said piece of thermo-plastic material around said arbor by a rolling action progressing from the back towards the tips of the fingers remote from the back while maintaining the piece of thermo-plastic material at a temperature below its fusion temperature but sufficiently elevated to impart a permanent set to the material upon subsequent cooling, then permitting the material to cool.

11. The method of forming a binder from a piece of thermo-plastic material having a back portion and a plurality of spaced parallel fingers extending from the back at substantially right angles thereto, which comprises bringing the back of said piece into engagement with an arbor of lesser circumference than the width of said piece and with the axis of the arbor parallel to the back so that the fingers extend from the back in a direction away from the arbor, curling said piece around the arbor with the fingers on the outside of the back, pressing said curled piece towards the arbor by wrapping a flexible sheet around said curled plastic piece through an angle which is a substantial fractional part of 360°, heating said piece to a temperature sufficient to soften the material enough to impart a permanent set thereto upon subsequent cooling thereof but insufficient to fuse the material, and then permitting the curled piece to cool on the arbor.

C. B. NELSON.
ISIDORE SPINNER.